(12) United States Patent
Tsui et al.

(10) Patent No.: US 8,471,833 B2
(45) Date of Patent: Jun. 25, 2013

(54) HANDHELD ELECTRONIC DEVICE, EXECUTING APPLICATION METHOD, AND DIGITAL DATA STORAGE MEDIA

(75) Inventors: Yuan-Mao Tsui, Taoyuan (TW); Hok-sum H Luke, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 1052 days.

(21) Appl. No.: 12/404,378

(22) Filed: Mar. 16, 2009

(65) Prior Publication Data

US 2009/0273587 A1    Nov. 5, 2009

(30) Foreign Application Priority Data

May 2, 2008 (TW) .................. 97116329 A

(51) Int. Cl.
*G06F 3/033* (2006.01)
*G06F 3/041* (2006.01)

(52) U.S. Cl.
USPC .......................................... 345/179; 345/173

(58) Field of Classification Search
None
See application file for complete search history.

(56) References Cited

U.S. PATENT DOCUMENTS

| | | | | |
|---|---|---|---|---|
| 2002/0173345 | A1* | 11/2002 | Swerup et al. ................ | 455/566 |
| 2003/0069039 | A1 | 4/2003 | Lin et al. | |
| 2004/0263493 | A1* | 12/2004 | Yueh .............................. | 345/179 |
| 2008/0036747 | A1* | 2/2008 | Hope ............................. | 345/179 |
| 2009/0278805 | A1* | 11/2009 | Kao et al. ..................... | 345/173 |

FOREIGN PATENT DOCUMENTS

| | | |
|---|---|---|
| CN | 2512034 | 9/2002 |
| CN | 1508711 | 6/2004 |
| CN | 1725785 | 1/2011 |

OTHER PUBLICATIONS

Chinese language office action dated Jul. 21, 2011.
English language translation of abstract of CN 2512034 (published Sep. 18, 2002).
English language translation of abstract of CN 1725785 (published Jan. 25, 2011).
Chinese language office action dated May 16, 2012.
English language translation of abstract of CN1508711 (published Jun. 30, 2004).

* cited by examiner

*Primary Examiner* — Joseph Haley
*Assistant Examiner* — Emily Frank
(74) *Attorney, Agent, or Firm* — McClure, Qualey & Rodack, LLP

(57) ABSTRACT

An application executing method is provided. The application executing method is applied to a handheld electronic device having a body and a touch element. The touch element is disposed at the body. The application executing method comprises the following steps. Firstly, a communication mode is entered. Next, whether the touch element is moved is detected. If the touch element is moved, then an application is activated.

12 Claims, 3 Drawing Sheets

HANDHELD ELECTRONIC DEVICE, EXECUTING APPLICATION METHOD, AND DIGITAL DATA STORAGE MEDIA

This application claims the benefit of Taiwan application Serial No. 97116329, filed May 2, 2008, the subject matter of which is incorporated herein by reference.

BACKGROUND OF THE APPLICATION

As handheld electronic devices such as touch phone and personal digital assistant (PDA) phone have gained great popularity and rapid advance, manufacturers are dedicated to the attempt of integrating various functions in the same handheld electronic device to meet consumers' versatile needs.

For example, when the user makes a phone call with a PDA (personal digital assistant) phone, the user may need to take down the content of the talk during the call such as a telephone number or an address provided by the other party. By integrating a notepad application into the PDA phone, the user is able to take down the content of the talk during the call. Besides, PDA phone normally has a stylus with which the user can easily operate the PDA phone. If the use needs to activate the notepad application while making a phone call with a current PDA phone, the user has access many paths and menus to select and activate the notepad application, and thus which is inconvenient for the user and causes the other party to wait over a long time.

SUMMARY OF THE APPLICATION

The application is directed to a handheld electronic device, an application executing method, and a digital storage medium. When a touch element is moved under a communication mode, which implies that the user would like to operate an application with the touch element, the application is executed. Thus, the user has better efficiency in activating an application.

According to a first aspect of the present application, a handheld electronic device is provided. The device comprises a body, a touch element, a communication module, a detection unit, and a processing unit. The touch element is disposed at the body. The communication module is for the device to enter a communication mode. The detection module is coupled to the communication module for determining whether the touch element is moved under a communication mode. The processing unit is coupled to the detection unit. If the touch element is moved under a communication mode, then the processing unit activates an application.

According to a second aspect of the present application, an application executing method is provided. The application executing method is applied to a handheld electronic device having a body and a touch element. The touch element is disposed at the body. The application executing method comprises the following steps. Firstly, a communication mode is entered. Next, whether the movement of the touch element is detected. If the touch element is moved, then an application is activated.

According to a third aspect of the present application, a digital storage medium is provided. The digital storage medium has many commands executable on a handheld electronic device, and the handheld electronic device executes an application executing method after executing these commands. The handheld electronic device comprises a body and a touch element. The touch element is disposed at the body. The application executing method comprises the following steps. Firstly, a communication mode is entered. Next, whether the movement of the touch element is detected. If the touch element is moved, then an application is activated.

The application will become apparent from the following detailed description of the preferred but non-limiting embodiments. The following description is made with reference to the accompanying drawings.

DETAILED DESCRIPTION OF THE APPLICATION

Figure 1:
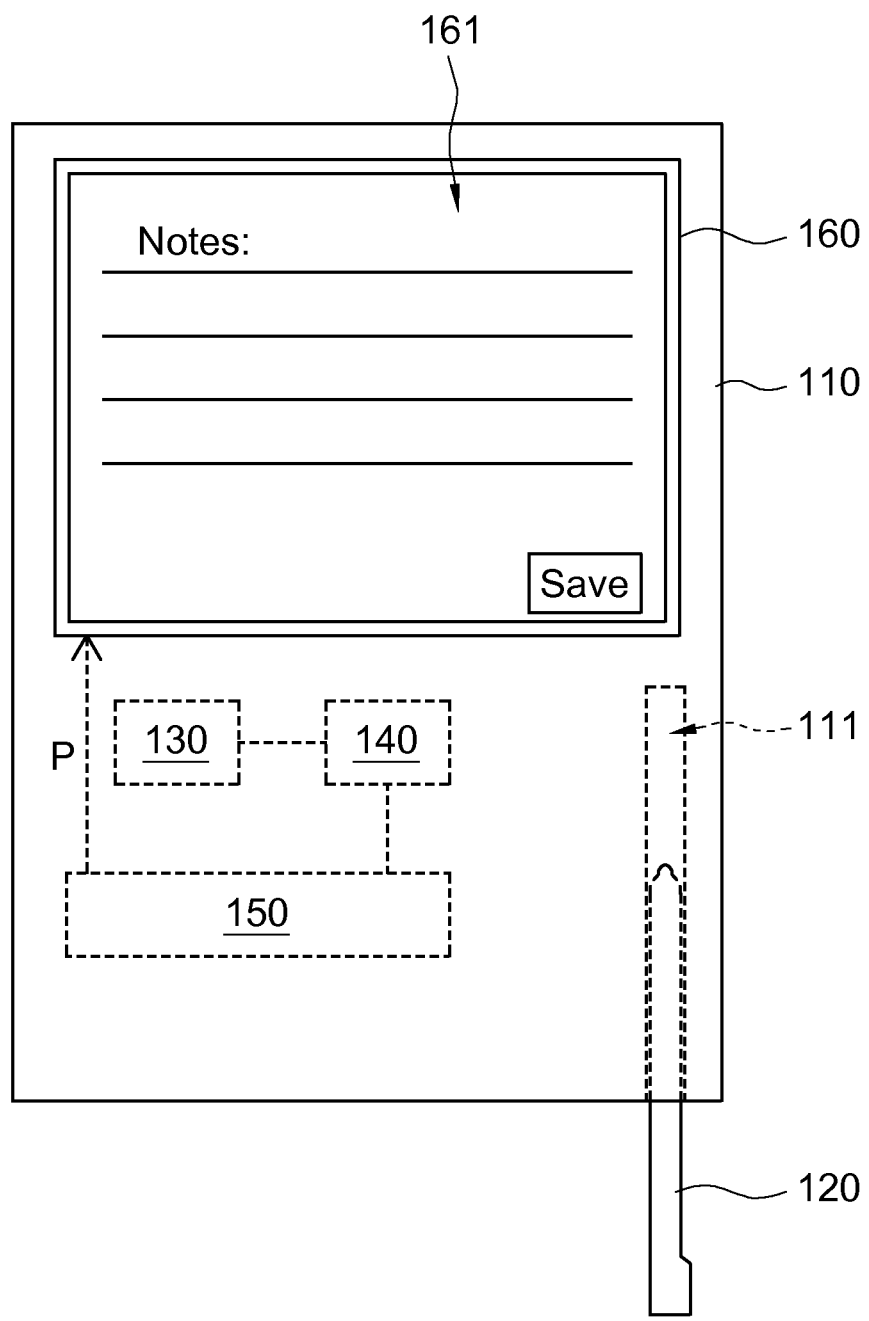
FIG. 1 shows a handheld electronic device according to a preferred embodiment of the application.

Referring to FIG. 1, a handheld electronic device according to an embodiment of the application is shown. The handheld electronic device 100, such as a touch phone or a personal digital assistant (PDA) phone, comprises a body 110, a touch element, a communication module 130, a detection unit 140, and a processing unit 150.

In the present embodiment of the application, the touch element is exemplified by a stylus 120. The stylus 120 is disposed at the body 110 by way of being inserted into a slot 111 of the handheld electronic device 100. The communication module 130 is for entering a communication mode. The detection unit 140 is coupled to the communication module 130 and the processing unit 150 for determining whether the stylus 120 is moved under a communication mode. If the detection unit 140 detects that the stylus 120 is moved under a communication mode, the processing unit 150 activates an application P such as a notepad application.

Generally speaking, when the user moves the stylus 120 under a communication mode, which implies that the user would like to operate the application P with the stylus 120. For example, the user may take down the content of the talk during the call with the stylus 120 in the notepad application. In the present embodiment of the application, when the stylus 120 is moved under a communication mode, the application P is automatically activated. Thus, there is no need to activate the application P by accessing many paths and menus to active the application P after the stylus 120 is moved in a communication mode. Therefore, the efficiency of activating the application P is increased, user convenience is improved, and product competiveness is enhanced.

Figure 2:
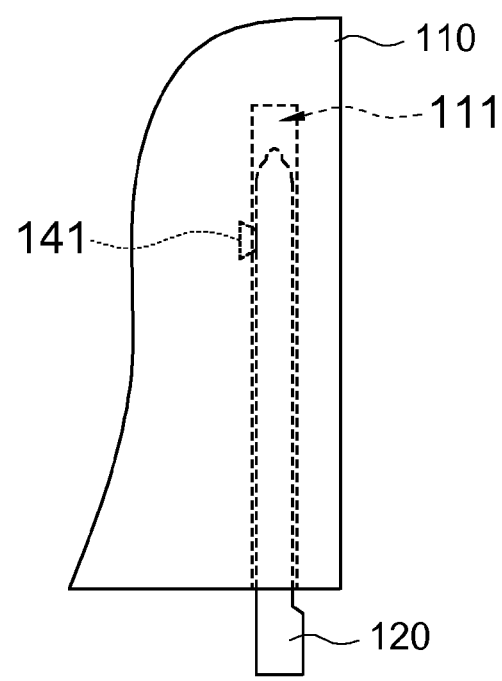
FIG. 2 shows a partial enlargement of the handheld electronic device of FIG. 1 including a switch.

In an embodiment of the application, the detection unit 140 detects whether the stylus 120 is moved according to whether the stylus 120 is removed from the slot 111. The detection unit 140 detects whether the stylus 120 is removed from the slot 111 by a switch or a capacitance sensor of the handheld electronic device 100. Referring to FIG. 2, a partial enlargement of the handheld electronic device of FIG. 1 including a switch is shown. The switch 141 is disposed at one side of the slot 111 and is electrically connected to the body 110. When the stylus 120 is inserted into the slot 111, the stylus 120 presses the switch 141 and pushes the switch 141 into the body 110. When the stylus 120 is removed from the slot 111, the stylus 120 releases the switch 141. The detection unit 140 detects whether the stylus 120 is removed from the slot 111 according to whether the switch 141 is released. When the detection unit 140 detects that the switch 141 is released, which implies that the stylus 120 is removed from the slot 111, the processing unit 150 activates the application P.

Figure 3:
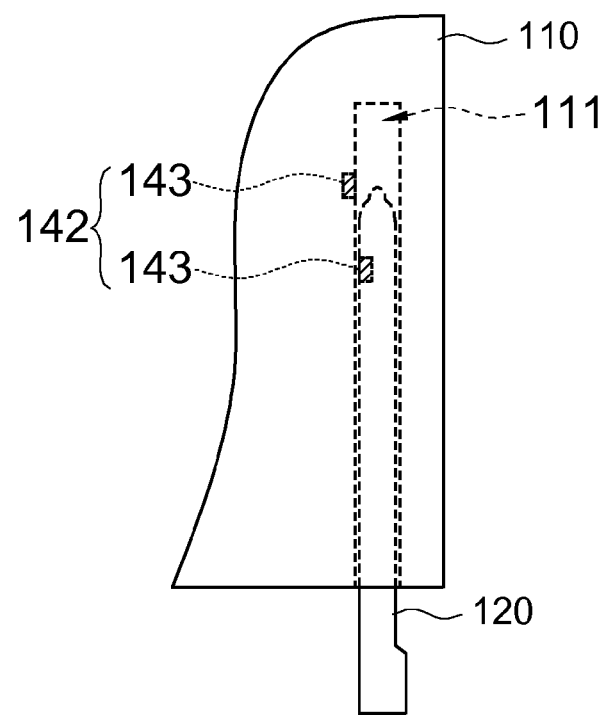
FIG. 3 shows a partial enlargement of the handheld electronic device of FIG. 1 including a capacitance sensor.

Referring to FIG. 3, a partial enlargement of the handheld electronic device 100 of FIG. 1 including a capacitance sensor 142 is shown. The capacitance sensor 142 comprises two metal conductors 143 and 144 respectively disposed on a side of the slot 111 and on a side the stylus 120. The two metal conductors 143 and 144 are disposed in the manner that when the stylus 120 is removed, the two metal conductors 143 and 144 move towards each other and then depart away from each other gradually, or the two metal conductors 143 and 144 contact to each other firstly and then depart, such that the charges of the metal conductors 143 and 144 would change. The detection unit 140 detects whether the stylus 120 is removed from the slot 111 according to the change in the charges of the metal conductor 143 or 144.

In one embodiment of the application, the detection unit 140 repeatedly detects whether the stylus 120 is removed from the slot 111 under a communication mode. Moreover, the communication module 130 receives or sends a call Ca request so as to enter a communication mode. The handheld electronic device 100 further comprises a touch screen 160. The touch screen 160 is coupled to the processing unit 150. When the stylus 120 is removed from the slot 111 under a communication mode, the processing unit 150 activates an application P and shows an input interface 161 of the application P on the touch screen 160. The input interface 161 is for the user to input a data Dt with the stylus 120. The data Dt is saved with regard to the call Ca, for example, the call history of the call Ca. Thus, the user can view the data Dt by clicking relevant records of the call Ca from the call history.

Furthermore, after the detection unit 140 detects the movement of the stylus 120 under a communication mode, the detection unit 140 further detects whether the stylus 120 is moved to the initial position. If the detection unit 140 detects that the stylus 120 is moved to the initial position, the processing unit 150 closes the application P. For example, after the detection unit 140 detects that the stylus 120 is removed from the slot 111 under a communication mode, the processing unit 150 activates the application P. If the detection unit 140 detects that the stylus 120 is inserted into the slot 111 again, then the processing unit 150 closes the application P. Thus, after the user put the stylus 120 into the initial position, the application P will be automatically closed. In another embodiment, the processing unit 150 shows a window on the touch screen 160 to enquire the user whether to close the application P. In yet another embodiment, if the user has not stored the inputted data Dt when put the stylus into the initial position, then the processing unit 150 shows a window the touch screen 160 to enquire the user whether to store the data Dt before closing the application P.

Furthermore, in another embodiment of the application, when the stylus 120 is moved and the application P is activated, the operating mode of the handheld electronic device 100 is changed to a speakerphone mode, i.e. the speakerphone of the handheld electronic device 100 is turned on.

In the present embodiment of the application, the stylus 120 of the touch element is disposed at the body 110 of the handheld electronic device 100. In other embodiments, the touch element can be disposed outside the body 110 of the handheld electronic device 100 and connected to the handheld electronic device 100.

Figure 4:
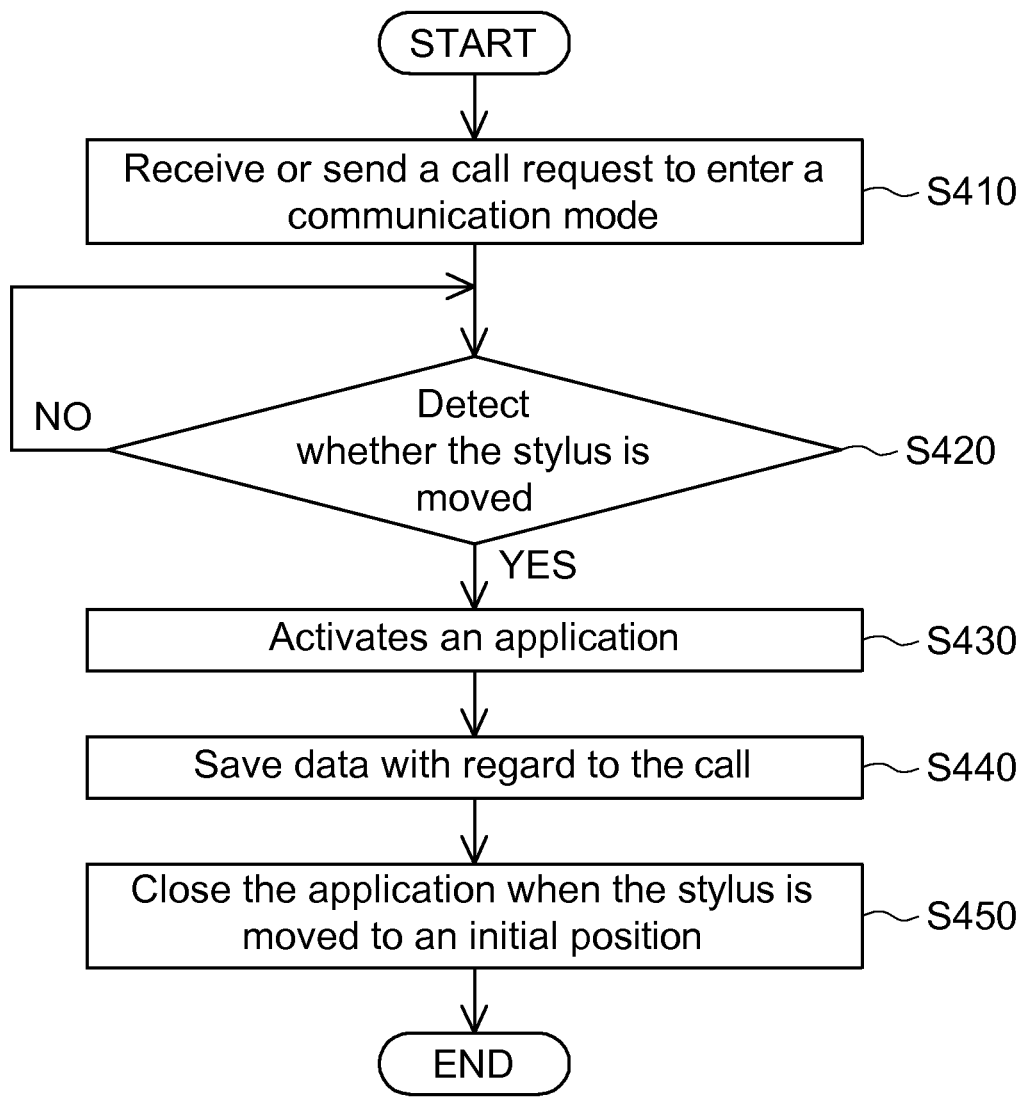
FIG. 4 shows a flowchart of an application executing method according to a preferred embodiment of the application.

Referring to FIG. 4, a flowchart of an application executing method according to an embodiment of the application is shown. The application executing method of the present embodiment of the application employs the handheld electronic device 100 of FIG. 1 to implement each step of FIG. 4. However, the application is not limited thereto. Anyone who is skilled in the technology of the application will understand that the steps and order of the application executing method may be adjusted or modified to fit actual needs.

Firstly, the method begins at step S410, the communication module 130 receives or sends a call Ca request to enter a communication mode. Next, the method proceeds to step S420, the detection unit 140 detects whether the stylus 120 is moved. If the detection unit 140 detects that the stylus 120 is moved, then the method proceeds to step S430. IF the detection unit 140 detects that the stylus 120 is not moved, then the step S420 is repeated to detect whether the stylus 120 is moved.

In step S420, the detection unit 140 detects whether the stylus 120 is moved according to whether the stylus 120 is moved from the slot 111. In one embodiment of the application, the detection unit 140 detects whether the stylus 120 is removed from the slot 111 according to whether the switch 141 is released. In another embodiment of the application, the detection unit 140 may detects whether the stylus 120 is removed from the slot 111 according to the change in the charges of the metal conductor 143 or 144.

As indicated in step S430, the processing unit 150 activates an application P, for example a notepad application. In an embodiment of the application, the processing unit 150 activates the application P and shows an input interface 161 on the touch screen 160 for the user to input a data Dt. Furthermore, in another embodiment of the application, the processing unit 150 changes the operating mode of the handheld electronic device 100 to a speakerphone mode, i.e. the processing unit 150 turns on the speakerphone of the handheld electronic device 100. Then, the method proceeds to step S440, the data Dt is saved with regard to the call history of the call Ca. Afterwards, the method proceeds to step S450, when the detection unit 140 detects that the stylus 120 is moved to the initial position, the processing unit 150 closes the application P.

The above application executing method may be programmed and stored in a digital data storage medium executable on the handheld electronic device 100. The digital data storage medium, such as secure digital (SD) card, memory stick (MS) and multimedia memory card (MMC), has the above application executing function after the application executing method is executed on the handheld electronic device 100.

According to the handheld electronic device, the application executing method, and the digital storage medium disclosed in the above embodiments of the application, an application is automatically activated when the user removes a touch element under a communication mode. The touch element is a stylus and the application is a notepad application for example. Thus, the user can immediately input data to an input interface of the notepad application with the stylus without having to activate the notepad application manually, hence saving time, improving user convenience, and enhancing product competiveness. Besides, the data inputted by the user is saved with respect to the call history of the call. Thus, the user can view the data Dt by clicking relevant records of the call Ca from the call history. Also, after the user moves the stylus to the initial position, the application is automatically closed.

While the application has been described by way of example and in terms of embodiments, it is to be understood that the application is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A handheld electronic device, comprising:
   a body;
   a stylus;
   a slot, wherein the stylus is disposed at the body by way of being inserted into the slot;
   a communication module for entering a communication mode;
   a detection unit coupled to the communication module, wherein the detection unit detects whether the stylus is removed from the slot under the communication mode; and
   a processing unit coupled to the detection unit, wherein when the stylus is determined as being removed from the slot under the communication mode, the processing unit activates an application and changes an operating mode of the handheld electronic device to a speakerphone mode.

2. The handheld electronic device according to claim 1, further comprising:
   a switch disposed at one side of the slot and electrically connected to the body;
   wherein the stylus presses the switch when the stylus is inserted into the slot and releases the switch when the stylus is removed from the slot;
   the processing unit activates the application when the detection unit detects that the switch is released.

3. The handheld electronic device according to claim 1, wherein the detection unit repeatedly detects whether the stylus is removed from the slot under the communication mode. the communication mode.

4. The handheld electronic device according to claim 1, wherein after the detection unit detects that the stylus is removed from the slot under the communication mode, the detection unit further detects whether the stylus is inserted into the slot: if the stylus is inserted into the slot, then the processing unit closes the application.

5. The handheld electronic device according to claim 1, wherein the application is a notepad application.

6. The handheld electronic device according to claim 5, wherein the data is saved with regard to the call.

7. An application executing method applied to a handheld electronic device, wherein the handheld electronic device comprises a body, a stylus and a slot, wherein the stylus is disposed at the body by the way of being inserted into the slot, the application executing method comprises:
   a. entering a communication mode;
   b. determining whether the stylus is removed from the slot; and
   c. activating an application and changing an operating mode of the handheld electron device to a speakerphone mode if the stylus is determined as being removed from the slot.

8. The application executing method according to claim 7, wherein in the step b is repeated if the stylus is removed from the slot.

9. The application executing method according to claim 7, wherein after the step c, the method further comprises:
   closing the application when the stylus is determined as being inserted into the slot.

10. The application executing method according to claim 7, wherein the handheld electronic device comprises a touch screen, and the application is a notepad application, wherein the notepad application comprises an input interface, in the step c of the application executing method, the notepad application is activated and the input interface is shown on the touch screen for a user to input a data.

11. The application executing method according to claim 10, wherein in the step d, the data is saved with regard to the call history of the call.

12. A non-transitory digital storage medium having a plurality of commands executable on a handheld electronic device, wherein the handheld electronic device comprises a body, a stylus and a slot, wherein the stylus is disposed at the body by way of being inserted into a slot, the commands executing a method comprising:
   a. entering a communication mode;
   b. determining whether the stylus is removed from the slot; and
   c. activating an application and changing an operating mode of the handheld electronic device to a speakerphone mode if the stylus is determined as being removed from the slot.

* * * * *